United States Patent
Eaton et al.

(10) Patent No.: US 6,797,893 B2
(45) Date of Patent: Sep. 28, 2004

(54) METHOD AND SCALE SYSTEM AND TRANSDUCER USED IN SUCH SCALE SYSTEM FOR RAPIDLY DETERMINING WEIGHTS OF ITEMS SUCH AS MAIL PIECES

(75) Inventors: David J. Eaton, Newtown, CT (US); John E. Massucci, Bronx, NY (US); John P. Miller, Shelton, CT (US)

(73) Assignee: Pitney Bowes Inc., Stamford, CT (US)

( * ) Notice: Subject to any disclaimer, the term of this patent is extended or adjusted under 35 U.S.C. 154(b) by 202 days.

(21) Appl. No.: 10/185,827

(22) Filed: Jun. 28, 2002

(65) Prior Publication Data

US 2004/0000437 A1 Jan. 1, 2004

(51) Int. Cl.[7] ............................................... G01G 23/02
(52) U.S. Cl. .................... 177/154; 177/184; 177/25.15; 705/407
(58) Field of Search ................................ 177/154–159, 177/184–189, 25.15; 705/407

(56) References Cited

U.S. PATENT DOCUMENTS

| | | | | |
|---|---|---|---|---|
| 3,613,808 A | * | 10/1971 | Bunnelle | 177/53 |
| 4,084,698 A | * | 4/1978 | Niederer | 209/649 |
| 4,351,033 A | | 9/1982 | Uchimura et al. | 364/900 |
| 4,516,209 A | | 5/1985 | Scribner | 384/466 |
| 4,742,878 A | | 5/1988 | Freeman et al. | 177/25 |
| 4,778,018 A | * | 10/1988 | Cordery et al. | 177/210 FP |
| 4,787,048 A | | 11/1988 | Freeman et al. | 364/466 |
| 4,836,312 A | * | 6/1989 | Hubbard | 177/210 FP |
| 5,119,306 A | | 6/1992 | Metelits et al. | 364/464 |
| 5,172,783 A | | 12/1992 | Feinland et al. | 177/185 |
| 5,178,228 A | | 1/1993 | Feinland et al. | 177/185 |
| 5,226,496 A | | 7/1993 | Feinland et al. | 177/25.15 |
| 5,266,749 A | * | 11/1993 | Dolan et al. | 177/154 |
| 5,717,166 A | | 2/1998 | Talmadge | 177/25.13 |
| 5,723,825 A | | 3/1998 | Dolan et al. | 177/145 |

* cited by examiner

*Primary Examiner*—Randy W. Gibson
(74) *Attorney, Agent, or Firm*—Brian A. Lemm; Angelo N. Chaclas

(57) ABSTRACT

A method scale system and transducer used in such system for rapid weighing of items. Said scale system includes: a transducer assembly; said transducer assembly in turn including, a transducer having a first member for supporting said item above a reference level, said first member producing a deflection proportional to said weight of said item, a clamping mechanism for clamping said first member to restrict deflection when activated, and a sensor for sensing said deflection and generating a signal representative of said weight as an output signal proportional to said deflection. Said scale system further includes a transport or platform for supporting said item during weighing, said transport being fixed to said first member, and a controller for controlling activation of said clamping mechanism. Said controller controls said clamping mechanism to clamp said transducer as said item is transported into position for weighing so that disturbances of said transducer are reduced and weighing time is decreased.

4 Claims, 3 Drawing Sheets

METHOD AND SCALE SYSTEM AND TRANSDUCER USED IN SUCH SCALE SYSTEM FOR RAPIDLY DETERMINING WEIGHTS OF ITEMS SUCH AS MAIL PIECES

BACKGROUND OF THE INVENTION

The present invention relates to a system and method for rapid weighing of items. More particularly it relates to scales or weighing systems used in postage metering systems used to weigh and determine postage for mail pieces or the like.

Postal scale systems are well known. Such scale systems weigh a mail piece and determine the appropriate postage for that mail piece as a function of the weight. Postal mailing systems where a mail piece is transported onto a postage scale system, the appropriate postage is determined, and the mail piece is then transported to postage metering system for imprinting with a postal indicium representative of the postage determined are also known. One such system is described in U.S. Pat. No. 4,742,878; issued May 10, 1988. In such systems there is a constant need to increase the rate at which the scale can determine the weight of a mail piece in order that the throughput of the system can be increased.

U.S. Pat. No. 4,787,048; issued: Nov. 22, 1988, discloses one approach to decreasing the time required for a postage scale system to determine the weight of a mail piece. The system disclosed in this patent takes advantage of the structure of postage rate charts, i.e., the function that relates the weight of the mail piece to the appropriate postage amount. Such rate charge provides a constant postage value for all weights between a pair of predetermined weight breaks. The system of the '048 patent takes advantage of this by use of an algorithm where a first estimate of the weight is made and used to determine the postage amount unless the first estimate is within a predetermined distance of a break point, in which case a second more accurate estimate is made.

While such systems have proven to be highly satisfactory for their intended purpose a basic problem remains that the weight of each mail piece in batches of mixed weight mail must be determined and the corresponding postage amount calculated before the vault (i.e. secure accounting registers which track postage expended by the meter to assure that the postal service receives payment for all mail pieces metered) can be debited for the postage amount and an appropriate indicium generated. As successive mail pieces are transported onto the scale system momentum from unbalanced rollers, mail piece collisions, spring reactions and the like is transmitted to the weight-sensing platform. These random excitations cause excessive displacements in the system transducer immediately prior to weight determination and increase the time required for the corresponding disturbances in the transducer output to decay sufficiently for an accurate weight to be determined.

Thus it is an object of the present invention to provide a method and system for decreasing the time required to determine the weight of items such as mail pieces.

BRIEF SUMMARY OF THE INVENTION

The above object is achieved and the disadvantages of the prior art are overcome in accordance with the present invention by means of a scale system and method of operation of such scale system where the scale system includes: a transducer assembly; the transducer assembly in turn including, a transducer having a first member for supporting the item above a reference level, the first member producing a deflection proportional to the weight of the item, a clamping mechanism for clamping the first member to restrict deflection when activated, and a sensor for sensing the deflection and generating a signal representative of the weight as an output signal proportional to the deflection. The scale system further includes a platform for supporting the item during weighing, the platform being fixed to the first member, and a controller for controlling activation of the clamping mechanism.

In accordance with one aspect of the present invention the transducer is a load cell comprising; the first member, a second vertical member attached to the reference surface, and a pair of flexible members connecting the first and second members to form a four-bar linkage, so that the first member can be deflected relative to the reference surface in response to the weight of the item, and the sensor includes a strain gauge fixed to one of the flexible members.

In accordance with another aspect of the present invention, when activated the clamping mechanism applies a force to the first member transversely to the deflection.

In accordance with another aspect of the present invention the transducer and platform provide a vertically deflectable mechanism for supporting the item above a reference level, and operation of the scale system includes; clamping the mechanism as the item is transported onto the mechanism, releasing the mechanism after the item is positioned on the mechanism, and then analyzing the output signal to determine a weight for the item.

Other objects and advantages of the present invention will be apparent to those skilled in the art from consideration of the detailed description set forth below and the attached drawings.

DETAILED DESCRIPTION OF PREFERRED EMBODIMENTS OF THE INVENTION

Figure 1:
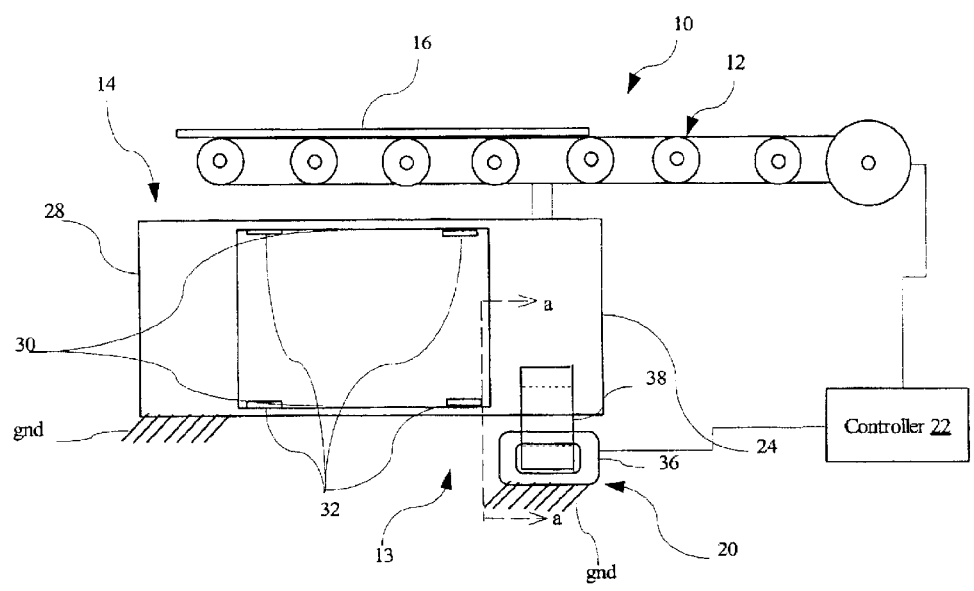
FIG. 1 shows semi-schematic plan view of a scale system in accordance with the present invention.
Figure 2:
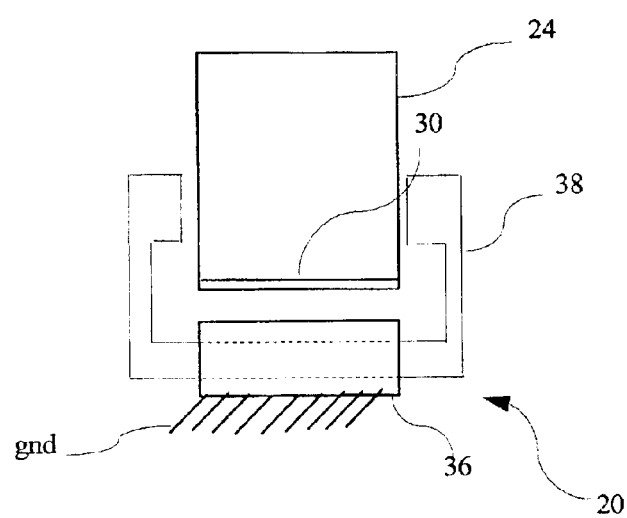
FIG. 2 shows a cross-section view along a—a in FIG. 1.

FIGS. 1 and 2 show scale system 10, which includes a conventional, transport 12, which is supported above a reference level, i.e. mechanical ground gnd, by transponder assembly 13. Assembly 13 includes conventional load cell 14 which functions as a transponder to generate an output signal representative of the weight of mail piece 16 on transport 12 in response to deflection of load cell 14. While load cell 14 is preferred other forms of deflection sensing transducers can be used in other embodiments of the present invention. Transponder assembly 13 also includes clamping mechanism 20 and sensor 32, and scale system 10 also includes controller 22, as will be described further below.

Load cell 14 includes a first vertical member 24 attached to and supporting transport 12 above mechanical ground gnd, a second vertical member 28 fixed to mechanical ground gnd, and flexible members 30 interconnecting members 24 and 28 to form a four bar linkage. Thus member 24 is deflected relative to mechanical ground gnd by the weight of mail piece 16. Sensor 32 consists of four strain gauges fixed to members 30 and interconnected and energized to form a bridge circuit (not shown) whose output is proportional to the deflection of member 24 and representative of the weight of mail piece 16. Operation of such load cells is well understood by those skilled in the art and need not be discussed further here for an understanding of the subject invention.

Clamping mechanism 20 includes electromagnetic coil 36 and resilient clamp 38 and is also fixed to mechanical ground gnd. When coil 36 is activated clamp 38 moves inwards, transversely to the deflection of member 24, to clamp member 24. This transverse clamping action is preferred, as it is believed that it will impart the minimal disturbance to load cell 14 as it is clamped and unclamped. Preferably clamp 38 acts solely by friction since the deflection of member 24 is so small (on the order of micro inches per ounce) that detents or the like would likely add more error than they might eliminate.

Figure 3:
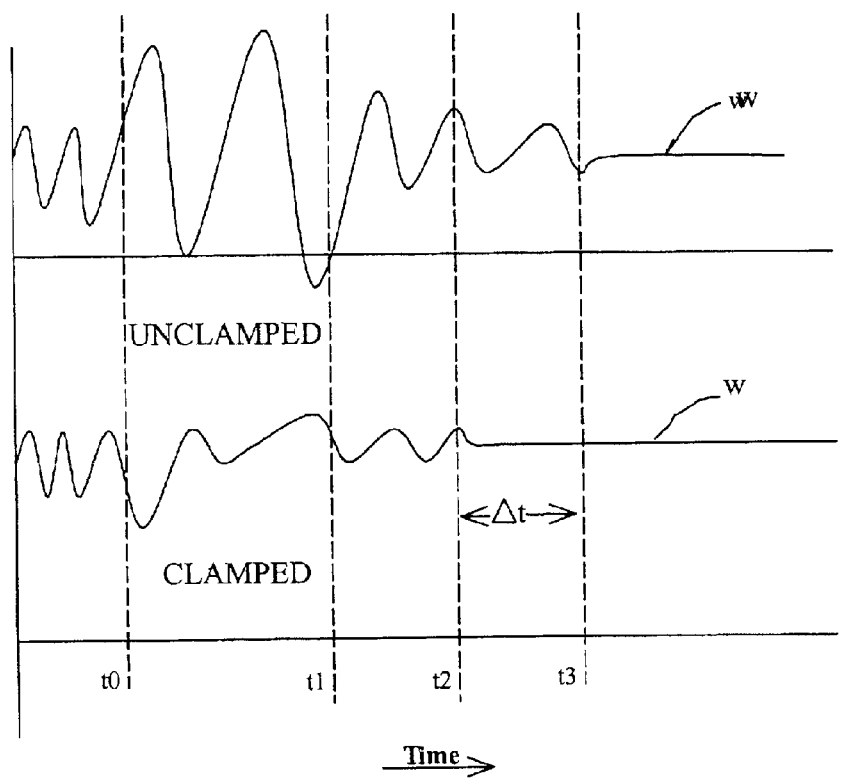
FIG. 3 shows a comparison of the expected response of a scale system in accordance with the present invention and the response of a prior art scale system.

FIG. 3 illustrates the anticipated effects of operation of scale system 10 in accordance with the method of the present invention on output signal w in comparison with the output of a similar, prior art, unclamped scale system. Prior to time t0 a conventional feeder (not shown) begins to feed mail piece 16 onto transport 12. At time t0, as mail piece 16 arrives on transport 12, controller 22 activates coil 36 to clamp load cell 14. Controller 22 than controls transport 12 to continue transport of mail piece 16 until it is in position for weighing at time t1, and then stops transport 12 and unclamps load cell 14. Controller 22, (or in other embodiments a separate processor, not shown) then analyses output signal w with any of several algorithms well known in the art to determine the weight of mail piece 16 at time t2.

Comparison with the output of a similar prior art scale system shows that, because load cell 14 is clamped by assembly 30 as mail piece 16 is transported into position for weighing the disturbances felt by load cell 14 are significantly reduced. Because systems such as scale system 10 are underdamped 2d order mechanical systems the time required for the disturbances of the output signal to decay sufficiently for the weight of mail piece 16 to be determined will vary proportionately with the magnitude of the disturbances. Thus it is expected that time t3, when the prior art system will determine the weight will be significantly greater than time t2.

Particular details of the design of scale system 10 will vary with particular applications and are well within the abilities of those skilled in the art and need not be discussed further her e for an understanding of the present invention.

The embodiments described above and illustrated in the attached drawings have been given by way of example and illustration only. From the teachings of the present application those skilled in the art will readily recognize numerous other embodiments in accordance with the present invention. Particularly, while the preferred embodiment described above has been described with respect to weighing of mail pieces, rapid weighing of any type of items is within the contemplation of the present invention.

What is claimed is:

1. A transducer assembly for generating a signal representative of a weight of an item, comprising:

a four bar linkage including a first member for supporting said item above a reference surface, a second member fixed to said reference surface, and a pair of flexible members connecting said first member and said second member, said first member being deflected in a first direction relative to said reference surface in response to supporting said item, said deflection of said first member being proportional to said weight of said item;

a clamping mechanism for clamping said first member to restrict deflection of said first member when activated, said clamping mechanism including an electromagnetic coil and clamp that moves in response to said electromagnetic coil being activated, said clamping mechanism applying a force to said first member in a second direction transverse to said first direction; and a sensor for sensing said deflection of said first member and generating said signal as an output signal proportional to said deflection, said sensor including at least one strain gauge coupled to one of said pair of flexible members.

2. A scale system for weighing an item, comprising:

a platform for supporting said item during weighing;

four bar linkage including a first member upon which said platform is mounted, said first member supporting said platform above a reference surface, a second member fixed to said reference surface, and a pair of flexible members connecting said first member and said second member, said first member being deflected in a first direction relative to said reference surface in response to said item being placed on said platform, said deflection of said first member being proportional to said weight of said item;

a clamping mechanism for clamping said first member to restrict deflection when activated, said clamping mechanism including an electromagnetic coil and clamp that moves in response to said electromagnetic coil being activated, said clamping mechanism applying a force to said first member in a second direction transverse to said first direction;

a sensor for sensing said deflection of said first member and generating a signal representative of said weight as an output signal proportional to said deflection, said sensor including at least one strain gauge coupled to one of said pair of flexible members; and a controller for controlling activation of said electromagnetic coil.

3. A scale system as described in claim 2 where said controller activates said electromagnetic coil as said item is transported to said platform and deactivates said electromagnetic coil for weighing of said item.

4. A scale system as described in claim 3 where said platform comprises a transport mechanism controlled by said controller, said controller activating said transport mechanism to transport said item onto said platform when said electromagnetic coil is activated, and stopping said transport mechanism and deactivating said electromagnetic coil for weighing of said item.

* * * * *